Patented June 13, 1950

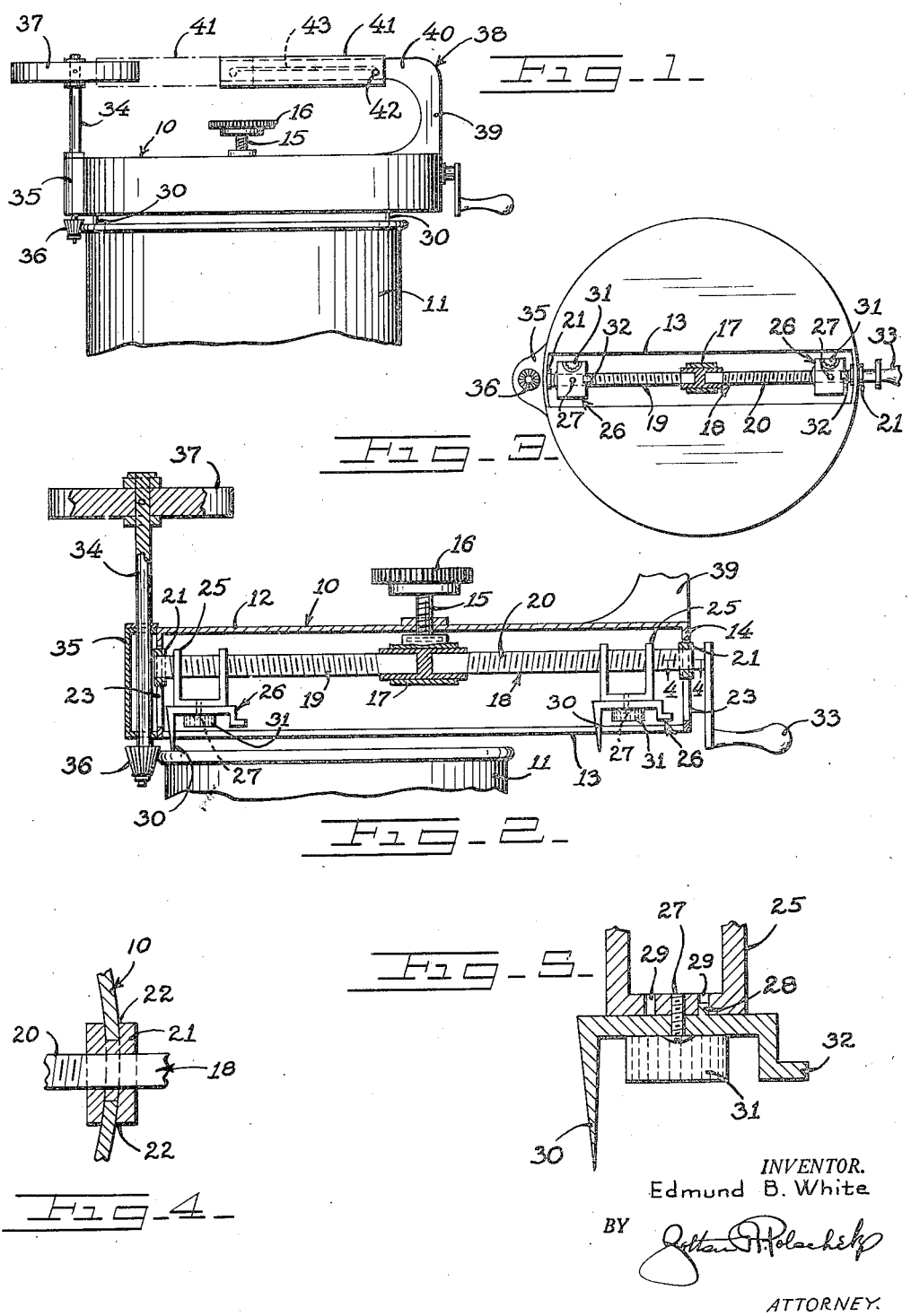

2,511,422

UNITED STATES PATENT OFFICE 2,511,422

CAN OPENER

Edmund B. White, Wollaston, Mass.

Application July 17, 1944, Serial No. 545,275

9 Claims. (Cl. 30—15)

1

This invention relates to new and useful improvements in a jar top lifter and can opener.

More particularly, the invention proposes an article as mentioned which is adapted to be placed upon a jar and manipulated to grip the cover so that it may be conveniently pulled to lift the cover from the jar.

The invention also proposes a construction whereby the article may be engaged upon a can to cut open the top.

Another important feature of the invention resides in so constructing the jar top lifter and can opener that it may be conveniently mounted on a wall bracket when desired.

The invention proposes to characterize the new and improved jar top lifter and can opener by the fact that it is provided with a casing for location upon or slightly above a jar or can to be opened and having top and bottom and side walls. It is proposed to threadedly mount a vertical screw centrally through the top wall. It is proposed to turnably mount horizontal screws upon the bottom of said vertical screw and to provide the horizontal screws with opposite hand threads on their opposite end portions. These end portions are provided with followers supporting tools adapted to carry out various operations. It is proposed to so construct these tools that they may be used to cut open the top of a can or to grip a jar top, or to pry beneath a jar top as required for a particular job.

The invention also proposes providing the casing with a novel handle by which lifting may be conveniently communicated to the casing, which in turn will be communicated to open a jar top.

Another and very important feature of the invention resides in providing the casing with a vertically turnably mounted rod having a tapered gear for engaging the edge of a can to be opened for turning purposes, and to provide the turnable rod with a handle across its top portion by which it may be conveniently turned. Furthermore, it is proposed to provide the casing with a stationary handle and with a tubular adjustably mounted extension for engaging upon the cross handle of said rod for forming a composite handle by which the article may be lifted when required.

Another object of the invention is the constructions of a device as mentioned which is simple and durable and which may be manufactured and sold at a reasonable cost.

For further comprehension of the invention, and of the objects and advantages thereof, reference will be had to the following description and accompanying drawings, and to the appended

2 claims in which the various novel features of the invention are more particularly set forth.

In the accompanying drawings forming a material part of this disclosure:

Fig. 1 is a side elevational view of a jar top lifter and can opener constructed in accordance with this invention.

Fig. 2 is a transverse vertical sectional view of the can opener shown in Fig. 1.

Fig. 3 is a bottom view of the jar top lifter and can opener shown in Fig. 1.

Fig. 4 is a fragmentary horizontal sectional view taken on the line 4—4 of Fig. 2.

Fig. 5 is a fragmentary enlarged sectional detailed view of a portion of Fig. 2.

The jar top lifter and can opener, in accordance with this invention, includes a casing 10 for location on or slightly above a jar or can 11 to be opened. This casing 10 has a top wall 12, a bottom wall 13 and side walls 14. The casing is circular in horizontal cross section. A vertical screw 15 is threadedly mounted centrally through the top wall 12. This screw is provided with a large head 16 by which it may be conveniently manually turned.

A horizontal socket 17 is mounted on the bottom of the screw 15. The connection between the screw 15 and socket 17 is rotative or swiveled so that the screw 15 is free to turn while the socket does not rotate. Horizontal screws 18 are turnably mounted through the socket 17 and have opposite hand threads 19 and 20 on their opposite end portions. The opposite extremities of the screws 18 rotatively engage bushings 21 which act in the nature of bearings for the screw. These bushings 21 have vertical grooves 22 along their sides by which they are vertically slidably mounted in vertical slots 23 formed in the side walls 14 of said casing 10.

Followers 25 are threadedly mounted on the end portions 19 and 20 of the screws 18. Composite tools 26 are mounted on the followers 25. Each follower 25 is in the nature of a U-shaped strip, the arms of which are formed with threaded openings threadedly engaging the screws 18. These U-shaped strips have flat bottoms against which the tools 26 are mounted. Each tool 26 is releasably held by a fastening element or screw 27. Each tool 26 has a projection 28 engageable in openings 29 formed in the bottom of the followers 25 to firmly hold the tools non-rotative. Each tool 26 has a sharp portion 30 with which a can may be cut open. Each tool has a downward projection 31 formed with serrations forming gripping jaws for gripping a jar top. Each tool 26 has a laterally bent portion 32 adapted to engage beneath a jar top by which the jar top may be pulled off.

A handle 33 is mounted upon one end of the screws 18 externally of the casing 10 by which the screws may be rotated. A vertical rod 34 is turnably mounted in a bearing portion 35 formed or mounted on the side wall of the casing 10. A tapered gear 36 is mounted on the bottom end of the rod 34 and is adapted to engage the rim of a tin can by which the cutting blades 30 may be caused to cut open the top of the can. A handle 37 is mounted transversely upon the top of the rod 34.

The casing 10 is provided with a stationary handle 38 having a vertical portion 39 continuing into a horizontal portion 40. A tubular extension 41 is slidably mounted on the horizontal portion 40 and is limited to be moved to an extended and retracted position by a pin 42 on the tube 41 engaging a bayonet slot 43 formed on the horizontal portion 40.

The operation of the device is as follows:

The device may be placed upon the top of a tin can, such as the tin can 11, and then the casing 10 may be squeezed downwards so that one of the cutting blades 30 punctures the top of the tin can at the edge of the can. Then the rod 34 is forced downwards so that the tapered gear 36 jams against the rim of the tin can. Now when the handle 37 is turned for driving the gear 36, the cutter blade 30 will be forced along the edge portion of the tin can top, cutting same open. When desired, the screws 27 may be removed and the tools 26 exchanged so that the cutting blades of each of the tools are given uniform wear.

If desired, for very large diameter cans, both of the blades 30 may be punctured through the top of a can and then the casing 10 be caused to rotate so that both blades 30 simultaneously cut the top of the can open. However, this operation is intended only under certain special circumstances.

The device may be used to open screw cap jars by turning the knob 16 to drive the screw 15 downwards so that the tool 26 projects out of a slot diametrical in the bottom wall 13. The screws 27 are then loosened and the jaws turned around through 90° so that the gripping portions 31 are opposed to each other. The screws 27 are then tightened. The article is placed on the jar and the handle 33 is turned to cause the jaws 31 to move together and grip the edge portion of the screw cap. The casing 10 is then turned for loosening and opening the screw cap.

The article may be used to pull off press on caps of jars by turning the tools 26 so that the projecting portions 32 are opposed to each other. The handle 33 is then manipulated to cause the projections 32 to engage beneath diametrically opposite edge portions of the press on cap. The tube 41 is then extended, and as indicated by the dot and dash lines 41', is engaged upon one end portion of the handle 37. The parts in this position form a good handle by which the article may be pulled upwards or may be turned, as required.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing.

2. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing, said vertical screw being provided with a knob by which it may be turned.

3. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing, said vertical screw being turnably connected with said horizontal socket.

4. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing, and a handle mounted on one end of said horizontal screws by which it may be turned.

5. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing, said bearings comprising bushings engaged upon the end portions of said horizontal screws, said bushings having grooves engaging slots in the side wall of said casing.

6. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing, said followers comprising inverted U-shaped strips the arms of which are threadedly engaged with said screws.

7. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing, said followers comprising U-shaped strips the arms of which are threadedly engaged with said screws, and said cutting blades being secured to the bottom of said followers.

8. A can opener, comprising a casing for location above a can to be opened and having top and bottom and side walls, a vertical screw threadedly mounted centrally through said top wall, a horizontal socket mounted on the bottom of said screw, horizontal screws turnably mounted through said socket and having opposite hand threads on their opposite end portions, bearings for the end portions of said horizontal screws and slidably mounted on the side walls of said casing, followers mounted on said opposite end portions of said horizontal screws, a sharp cutting blade depending from each of said followers through said casing bottom wall for cutting the top wall of said can, a rod turnably mounted on said casing and having a tapered gear for engaging the edge of a can to be opened for turning purposes, a handle across said rod, and a handle on said casing, said followers comprising U-shaped strips the arms of which are threadedly engaged with said screws, and said cutting blades being secured to the bottom of said followers, with screws and with flanges engaging openings in the followers to prevent turning.

9. A can opener comprising a casing for location on a can, said casing having top, bottom and side walls, a diametrical bottom wall slot and diametrically opposed vertical slots in the side wall in line with the bottom slot, horizontal screws, bearings rotatably supporting the screws, said bearings being slidably disposed in said vertical slots, said casing top wall having a center threaded opening, a vertical threaded shaft in said threaded opening, means connecting said threaded shaft with said screws for raising and lowering said screws in said vertical slots by rotation of said threaded shaft, means for rotating said screws, a can-cutting device carried by said screws, said device having a depending can-cutting blade and threads coacting with said screws for longitudinal movement of said device along said screws, a vertical rod journalled in said casing top and bottom walls outwardly of said slot and depending below said bottom wall, and a toothed cone on the bottom of said rod disposed with its apex down for engaging the rim of said can whereby rotation of said rod will effect rolling of said cone on said rim, effecting rotation of said can relative to said blade.

EDMUND B. WHITE.

REFERENCES CITED

The following references are of record in the file of this patent:

UNITED STATES PATENTS

| Number | Name | Date |
|---|---|---|
| 1,667,360 | Sweeney | Apr. 24, 1928 |
| 2,176,714 | Hoppenstand | Oct. 17, 1939 |

FOREIGN PATENTS

| Number | Country | Date |
|---|---|---|
| 3,666 | Great Britain | Feb. 22, 1905 |